(12) United States Patent
Hsu et al.

(10) Patent No.: US 10,971,315 B2
(45) Date of Patent: Apr. 6, 2021

(54) KEY MODULE

(71) Applicants: LITE-ON ELECTRONICS (GUANGZHOU) LIMITED, Guangzhou (CN); Lite-On Technology Corporation, Taipei (TW)

(72) Inventors: Kuo-Hui Hsu, Taipei (TW); Cheng-Kun Liao, Taipei (TW)

(73) Assignees: LITE-ON ELECTRONICS (GUANGZHOU) LIMITED, Guangzhou (CN); Lite-On Technology Corporation, Taipei (TW)

(*) Notice: Subject to any disclaimer, the term of this patent is extended or adjusted under 35 U.S.C. 154(b) by 0 days.

(21) Appl. No.: 16/872,352

(22) Filed: May 11, 2020

(65) Prior Publication Data

US 2020/0373097 A1  Nov. 26, 2020

Related U.S. Application Data

(60) Provisional application No. 62/849,961, filed on May 20, 2019.

(30) Foreign Application Priority Data

Mar. 27, 2020  (CN) .......................... 202010228898.3

(51) Int. Cl.
| | |
|---|---|
| *H01H 13/12* | (2006.01) |
| *H01H 13/84* | (2006.01) |
| *H01H 3/12* | (2006.01) |
| *F21V 8/00* | (2006.01) |
| *H01H 13/83* | (2006.01) |
| *H01H 13/705* | (2006.01) |

(52) U.S. Cl.
CPC ........... *H01H 13/84* (2013.01); *G02B 6/0028* (2013.01); *G02B 6/0055* (2013.01); *H01H 3/125* (2013.01); *H01H 13/83* (2013.01); *H01H 13/705* (2013.01); *H01H 2219/044* (2013.01); *H01H 2219/06* (2013.01); *H01H 2219/0621* (2013.01); *H01H 2239/004* (2013.01)

(58) Field of Classification Search
CPC .... H01H 3/125; H01H 13/14; H01H 13/7065; H01H 13/705; H01H 13/70; H01H 3/12; H01H 15/16; H01H 2237/00; H01H 13/20; H01H 13/50
See application file for complete search history.

(56) References Cited

U.S. PATENT DOCUMENTS 5,758,763 A * 6/1998 Sanda .................... H01H 3/125
                                                         200/344

* cited by examiner

*Primary Examiner* — Ahmed M Saeed
(74) *Attorney, Agent, or Firm* — JCIPRNET

(57) ABSTRACT

The disclosure provides a key module including a bottom plate, a keycap and a scissor structure. The keycap is located above the bottom plate. The key cap includes a pivoting member protruding from the bottom surface and a sliding member. The pivoting member has a pivot hole and a hollowed-out area communicating with the pivot hole. The scissor structure is disposed between the bottom plate and the keycap, and includes a first leg and a second leg pivotally connected to each other, the first side of the first leg and the second side of the second leg are connected to the bottom plate, the third side of the first leg is rotatably connected to the pivoting member of the keycap, and the fourth side of the second leg is slidably connected to the sliding member of the keycap.

11 Claims, 7 Drawing Sheets

KEY MODULE

CROSS-REFERENCE TO RELATED APPLICATION

This application claims the priority benefits of U.S. provisional application Ser. No. 62/849,961, filed on May 20, 2019, and China application serial no. 202010228898.3, filed on Mar. 27, 2020. The entirety of each of the above-mentioned patent applications is hereby incorporated by reference herein and made a part of this specification.

BACKGROUND

Field of the Disclosure

The disclosure relates to a key module, and in particular to a key module of which the keycap is not prone to abnormal appearance.

Description of Related Art

In the injection process of plastic parts, if the thickness of the plastic parts is too large, it may cause shrinkage problems on the surface of the plastic parts. For the keycap of a key, if the surface of the keycap shrinks, the appearance thereof will be deformed and unaesthetic, resulting in a drop in yield rate.

SUMMARY OF THE DISCLOSURE

The disclosure is related to a key module of which the keycap appearance is not prone to abnormalities.

According to an embodiment of the disclosure, a key module includes a bottom plate, a keycap and a scissor structure. The keycap is located above the bottom plate. The keycap includes a pivoting member protruding from the bottom surface of the keycap and a sliding member. The pivoting member has a pivot hole and a hollowed-out area communicating with the pivot hole. The scissor structure is disposed between the bottom plate and the keycap, and includes a first leg and a second leg pivotally connected to each other. The first side of the first leg and the second side of the second leg are connected to the bottom plate. The third side of the first leg is rotatably connected to the pivoting member of the keycap, and the fourth side of the second leg is slidably connected to the sliding member of the keycap.

In the key module in the embodiment of the disclosure, the hollowed-out area is located between the pivot hole and the bottom surface of the keycap.

In the key module in the embodiment of the disclosure, the pivoting member includes two projections and a connecting portion connected to the two projections, the two projections and the connecting portion encircle the pivot hole together, and the hollowed-out area is formed at the connecting portion.

In the key module in the embodiment of the disclosure, the thickness of the projection in the extending direction on the third side of the first leg is between 0.7 mm and 1 mm, and the thickness of the connecting portion in the extending direction is between 0.3 mm and 0.6 mm.

In the key module in the embodiment of the disclosure, in the extending direction on the third side of the first leg, the length of the hollowed-out area is between ⅓ and ⅔ of the thickness of the projection.

In the key module in the embodiment of the disclosure, the pivoting member includes two projections, and the hollow-out area is formed between the two projections to separate the two projections.

In the key module in the embodiment of the disclosure, the hollowed-out area is also recessed in the bottom surface of the keycap.

In the key module in the embodiment of the disclosure, the hollowed-out area is recessed in the bottom surface of the keycap to a depth of 0.03 mm to 0.07 mm.

In the key module in the embodiment of the disclosure, the hollowed-out area includes a rectangular slot, a trapezoidal slot, an arc-shaped slot, or an irregular slot.

In the key module in the embodiment of the disclosure, the width of the hollowed-out area is smaller than the diameter of the pivot hole.

Based on the above, the key module of the disclosure can reduce the thickness of the keycap in this area by providing a hollowed-out area in the pivoting member of the keycap, thereby reducing the occurrence of shrinking of the outer surface of the keycap due to excessively large thickness in this area, such that the integrity of the appearance can be maintained.

BRIEF DESCRIPTION OF THE DRAWINGS

The drawings are included for facilitate understanding of the disclosure, and the drawings are incorporated in and constitute a part of this specification. The drawings illustrate embodiments of the disclosure and together with the description serve to explain the principles of the disclosure.

DESCRIPTION OF EMBODIMENTS

Figure 1:
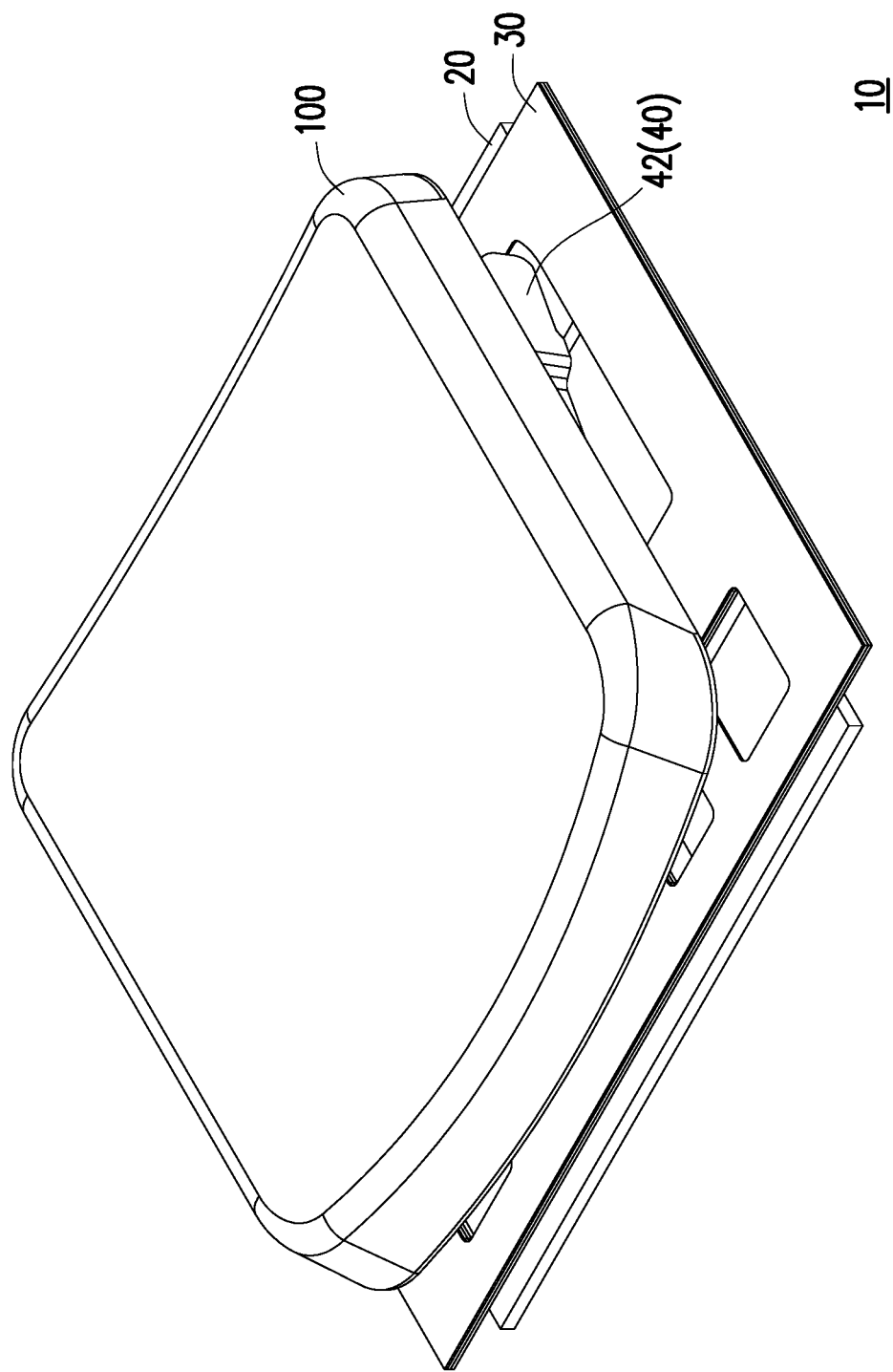
FIG. 1 is a schematic view of a key module according to an embodiment of the disclosure.

Reference will now be made in detail to exemplary embodiments of the disclosure, examples of which are illustrated in the drawings. Wherever possible, the same element symbols are used to indicate the same or similar parts in the drawings and descriptions.

Figure 2A:
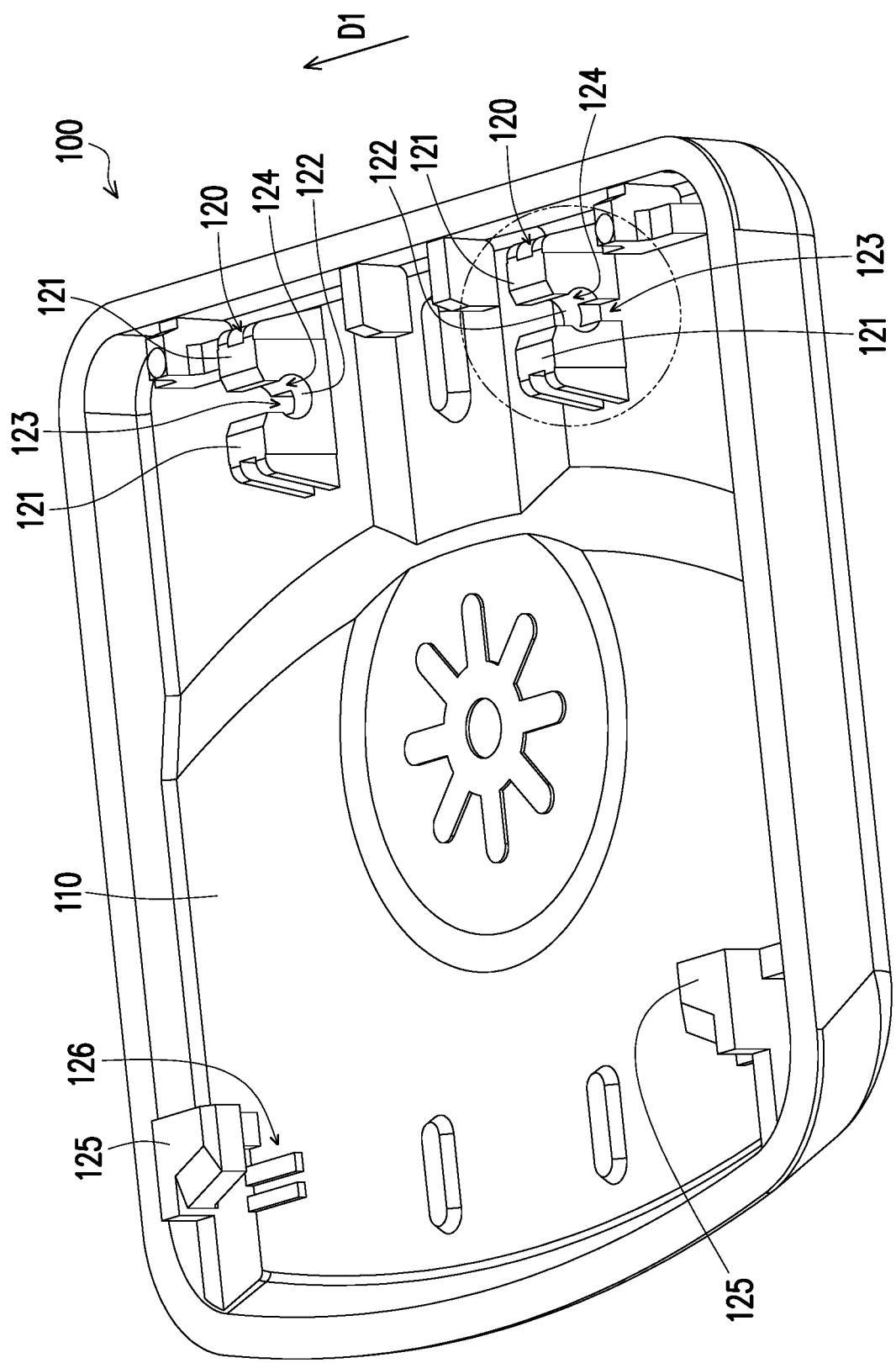
FIG. 2A is a schematic view of the bottom surface of the keycap of the key module of FIG. 1.
Figure 2B:
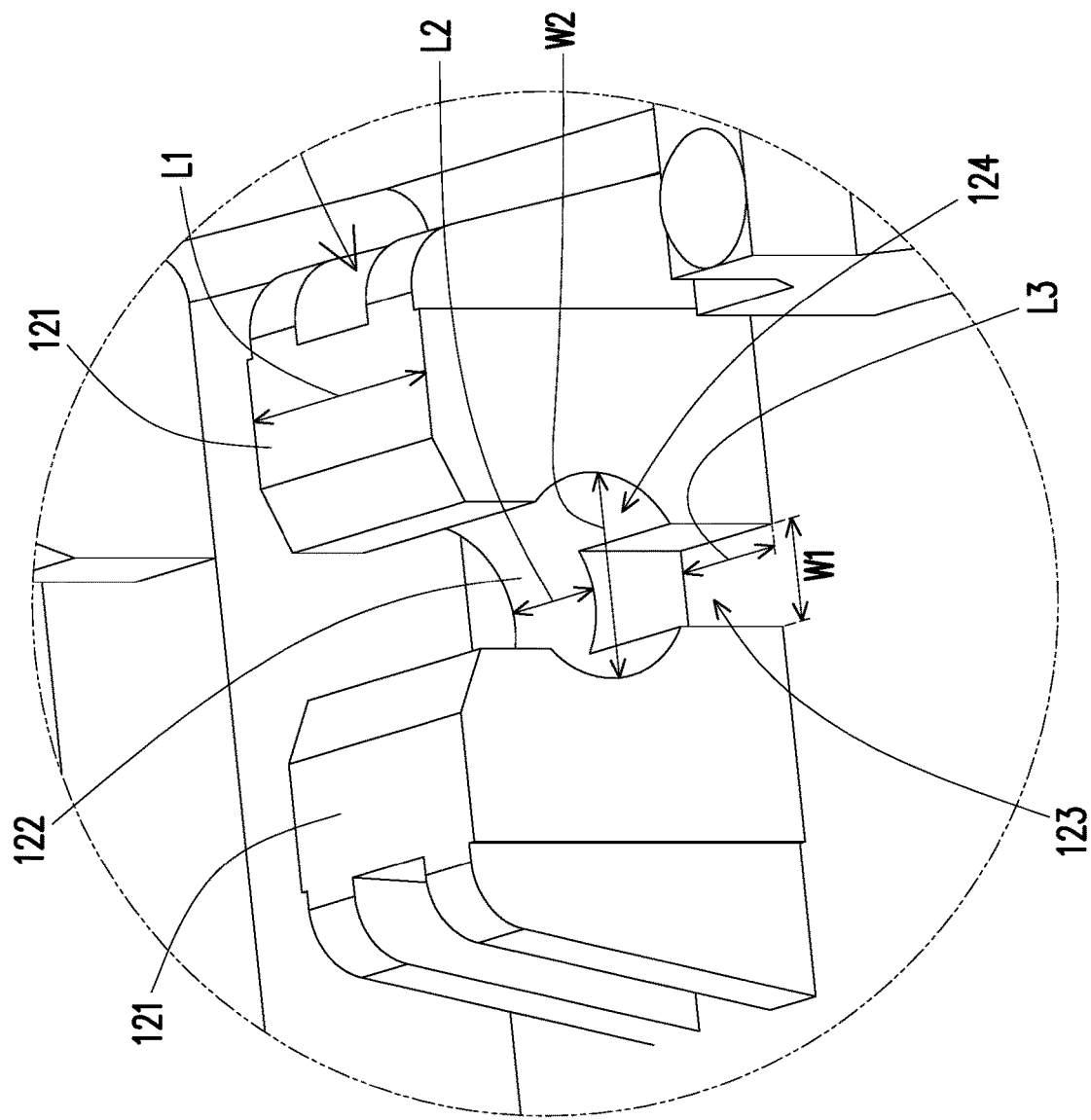
FIG. 2B is a partially enlarged schematic view of FIG. 2A.
Figure 3:
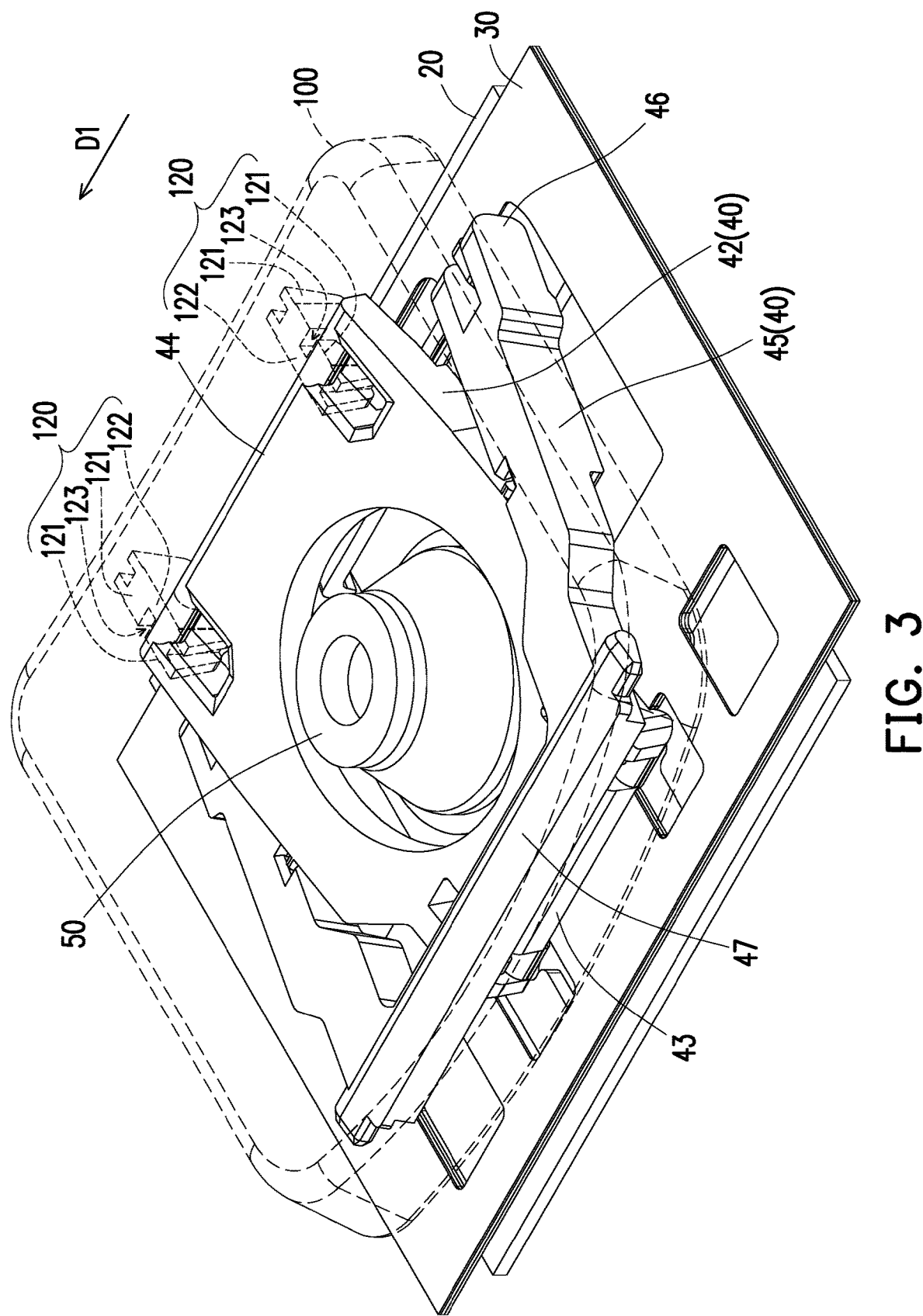
FIG. 3 is a perspective view of the keycap of FIG. 1.

FIG. 1 is a schematic view of a key module according to an embodiment of the disclosure. FIG. 2A is a schematic view of the bottom surface of the keycap of the key module of FIG. 1. FIG. 2B is a partially enlarged schematic view of FIG. 2A. FIG. 3 is a perspective view of the keycap of FIG. 1.

Please refer to FIG. 1 to FIG. 3. The key module 10 of this embodiment is, for example, one key module of the keyboard device, but the application of the key module 10 is not limited thereto. As shown in FIG. 3, in this embodiment, the key module 10 includes a bottom plate 20, a membrane circuit board 30, a scissor structure 40, an elastic body 50 and a keycap 100. The membrane circuit board 30 is disposed on the bottom plate 20, and the keycap 100 is disposed above the bottom plate 20 and the membrane circuit board 30. The scissor structure 40 is disposed between the bottom plate 20 and the bottom surface 110 of the keycap 100, such that the keycap 100 can be pressed down horizontally and lifted upward.

The elastic body 50 passes through the scissor structure 40 and is disposed between the keycap 100 and the membrane circuit board 30. The membrane circuit board 30 has a switch (not shown) corresponding to the keycap 100 and the elastic body 50. When the user presses the keycap 100, the elastic body 50 triggers the switch of the membrane circuit board 30, and the elastic body 50 deforms accordingly, thus accumulating elastic potential energy. When the force of pressing down the keycap 100 disappears, the elastic body 50 releases the elastic potential energy and lifts the keycap 100 upward.

In this embodiment, as shown in FIG. 2A and FIG. 3, the keycap 100 includes a pivoting member 120 and a sliding member 125 protruding from the bottom surface 110. The pivoting member 120 has a pivot hole 124, and the sliding member 125 has a sliding slot 126. The scissor structure 40 includes a first leg 42 and a second leg 45 pivotally connected to each other. The first leg 42 is located inside the second leg 45, that is, the first leg 42 is an internal shear, and the second leg 45 is an external shear. Certainly, the relative positions of the first leg 42 and the second leg 45 are not limited thereto.

More specifically, the first side 43 of the first leg 42 and the second side 46 of the second leg 45 are connected to the bottom plate 20, and the third side 44 of the first leg 42 is pivotally connected to the pivot hole 124 of the pivoting member 120 of the keycap 100, and is suitable for rotating relative to the pivoting member 120. The fourth side 47 of the second leg 45 is slidably disposed in the sliding slot 126 of the sliding member 125 of the keycap 100, and is suitable for sliding relative to the sliding member 125. In this way, through the above structural design, the keycap 100 can move up and down relative to the bottom plate 20 by means of the scissor structure 40.

It should be noted that, in the injection process of plastic parts, if the thickness of the plastic parts is too large, it may cause shrinkage problems on the surface of the plastic parts. In this embodiment, in order to reduce the occurrence of the appearance deformation of the keycap 100 due to excessively large thickness, as shown in FIG. 2A, a hollowed-out area 123 is specifically disposed at the pivoting member 120 with a larger thickness, thereby reducing the proportion of the portion of the keycap 100 with a relatively large thickness, such that the occurrence of appearance deformation of the keycap 100 can be reduced during injection molding.

Specifically, in this embodiment, the pivoting member 120 includes two projections 121 and a connecting portion 122 connected to the two projections 121. The two projections 121 and the connecting portion 122 encircle the pivot hole 124 together, and the hollowed-out area 123 is formed at the connecting portion 122 and communicates with the pivot hole 124. In this embodiment, the hollowed-out area 123 is disposed between the pivot hole 124 and the bottom surface 110 of the keycap 100, but the location of the hollowed-out area 123 is not limited thereto.

As shown in FIG. 2B, in this embodiment, the shape of the pivot hole 124 is similar to the combination of a rectangular hole at the upper part and a circular hole at the lower part. The diameter (width W2) of the circular hole at the lower part will be larger than the width of the rectangular hole at the upper part. In other words, the size of the pivot hole 124 close to the opening at the upper part is smaller than the size at the lower part, so that the third side 44 of the first leg 42 does not easily come off the pivot hole 124 after extending into the pivot hole 124 between the two projections 121. Certainly, the shape of the pivot hole 124 is not limited thereto. In other embodiments, the shape of the pivot hole 124 may also be a U-shaped hole. Moreover, in this embodiment, the shape of the hollowed-out area 123 is exemplified as a rectangular slot, but in other embodiments, the shape of the hollowed-out area 123 may also be a trapezoidal slot, that is, it may be in the shape that is wide at the top and narrow at the bottom or the shape that is narrow at the top and wide at the bottom. Alternatively, the shape of the hollowed-out area 123 can also be an arc-shaped slot, such as a semi-circle that is recessed downward, or alternatively, the shape of the hollowed-out area 123 can also be an irregular slot. The shape of the hollowed-out area 123 is not limited thereto.

As can be seen in FIG. 2B, the thickness L1 of the projection 121 in the extending direction D1 on the third side 44 of the first leg 42 (FIG. 3) is between 0.7 mm and 1 mm. The thickness L2 of the connecting portion 122 in the extending direction D1 is between 0.3 mm and 0.6 mm. The length L3 of the hollowed-out area 123 is between ⅓ and ⅔ of the thickness L1 of the projection 121. The length L3 of the hollowed-out area 123 is, for example, between 0.3 mm and 0.6 mm. The above design can make the two projections 121 of the pivoting member 120 have good connection strength. Certainly, the proportional relationship of thickness between the hollowed-out area 123, the connecting portion 122 and the projection 121 is not limited thereto. In addition, the width W1 of the hollowed-out area 123 is smaller than the diameter (that is, the diameter of the circular hole below the pivot hole 124, the width W2) of the pivot hole 124, so that the pivoting member 120 can provide support for the third side 44 of the first leg 42 (FIG. 3) so as not to fall into the hollowed-out area 123.

In this embodiment, by disposing the hollowed-out area 123 on the pivoting member 120, not only that the proportion of the thicker area of the keycap 100 can be reduced to decrease the appearance defect, since the two projections 121 of the pivoting member 120 inherently have sufficient structural strength and they are connected to each other through the connecting portion 122 and thus having a good connection strength, the size of the pivot hole 124 can also be well and stably maintained without expanding easily. In this way, the third side 44 of the first leg 42 can be stably rotated in the pivot hole 124 between the two projections 121, and the stability of the scissor structure 40 during operation can also be maintained well without affecting the feel of pressing.

Figure 4:
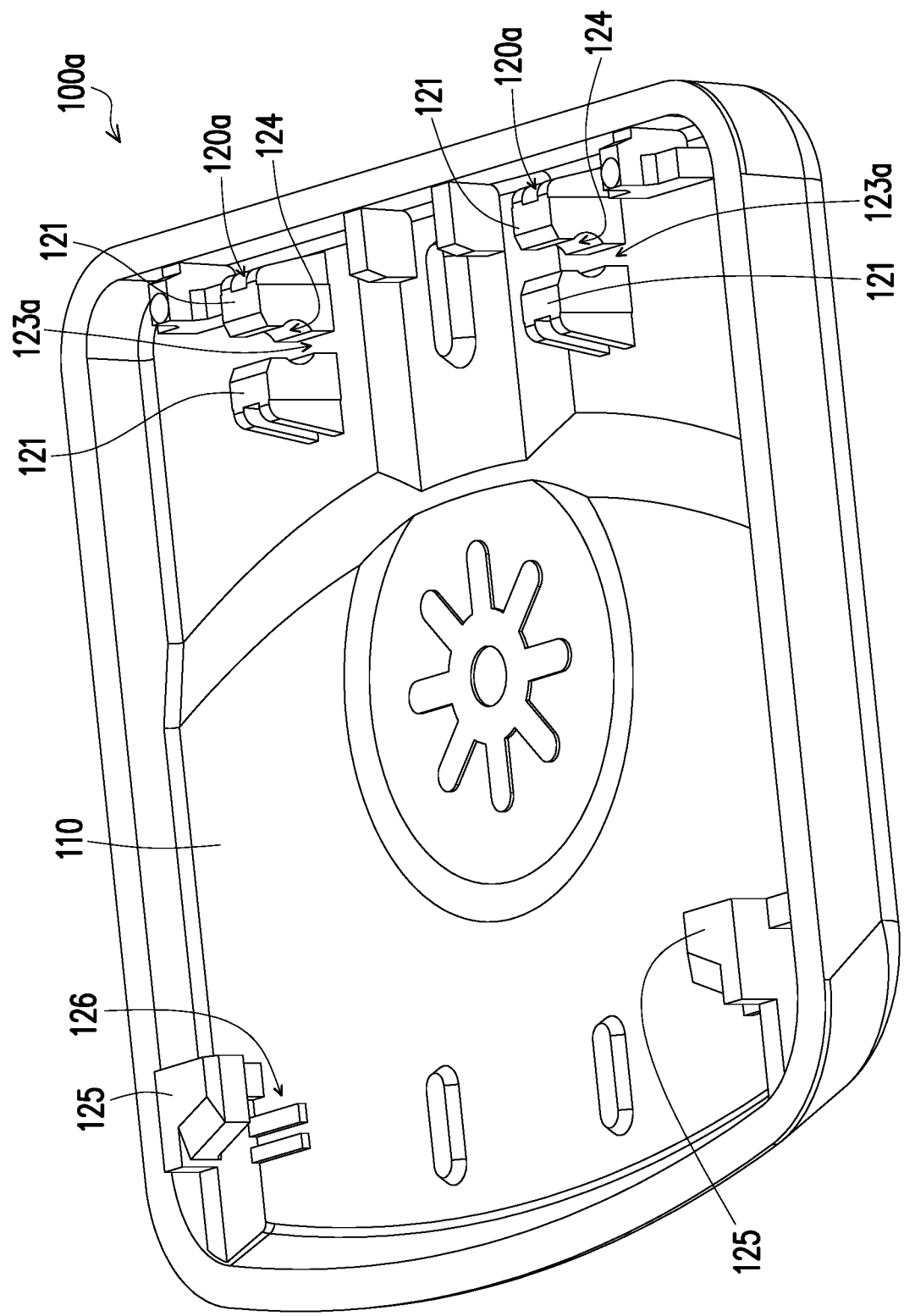
FIG. 4 is a schematic view of a bottom surface of a keycap of a key module according to another embodiment of the disclosure.

Certainly, the form of the pivoting member 120 is not limited to the above, and other implementations will be described below. FIG. 4 is a schematic view of a bottom surface of a keycap of a key module according to another embodiment of the disclosure. Please refer to FIG. 4. The main difference between the pivoting member 120a of the keycap 100a of FIG. 4 and the pivoting member 120 of the previous embodiment is that, in this embodiment, the pivoting member 120a has no connecting portion 122 (labeled in FIG. 2A), and the hollowed-out area 123a is formed between the two projections 121 to entirely separate the two projections 121.

Since the two projections 121 of the pivoting member 120a inherently have sufficient structural strength, the size of the pivot hole 124 can be maintained well and stably without easily expanding. Therefore, the stability of the scissor structure 40 (FIG. 3) during operation can be well maintained without affecting the feel of pressing. In addition, because the hollowed-out area 123a is enlarged, the proportion of the thicker area of the keycap 100 can be further reduced to decrease the probability of poor appearance due to excessively large thickness difference during injection molding.

Figure 5A:
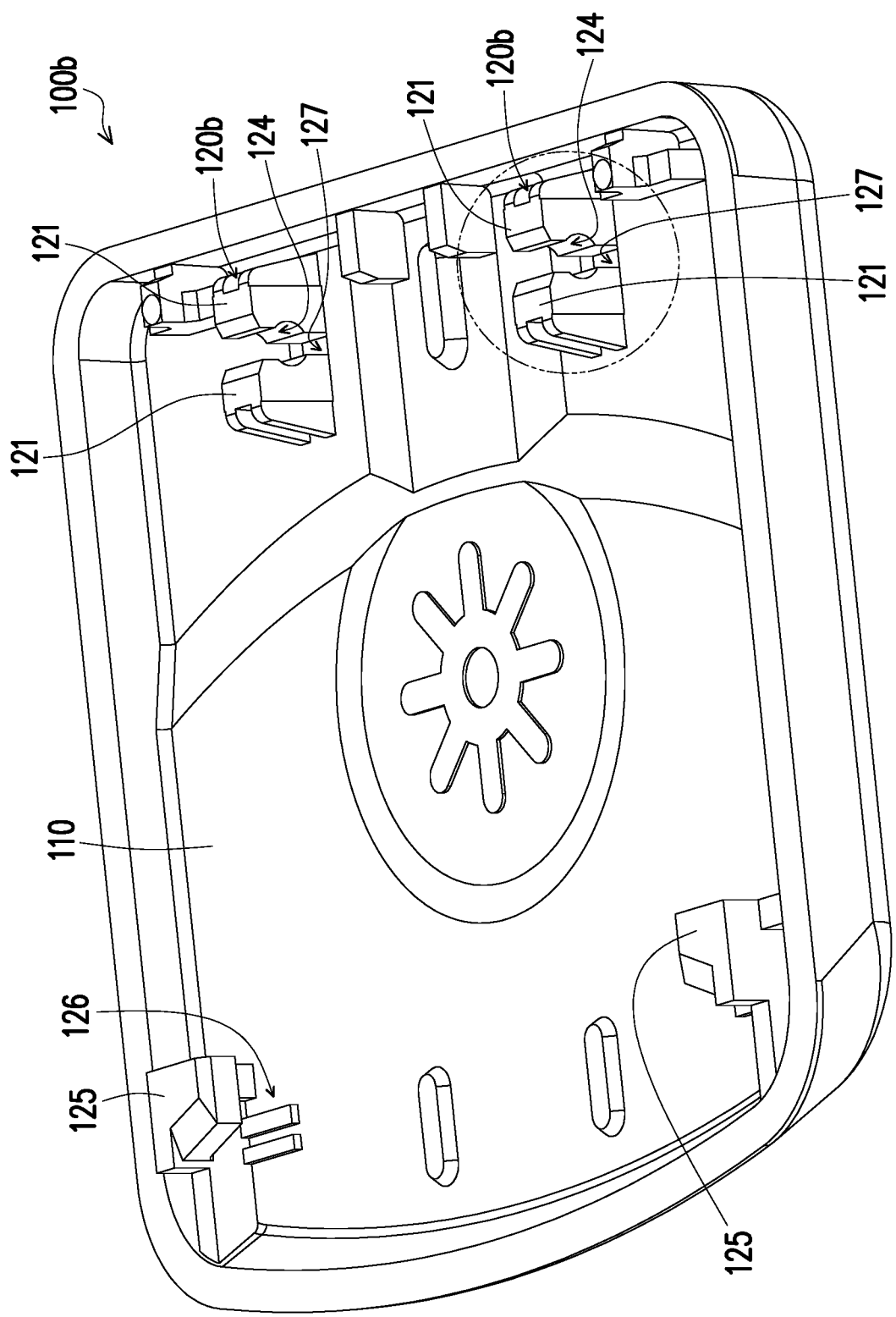
FIG. 5A is a schematic view of a bottom surface of a keycap of a key module according to still another embodiment of the disclosure.
Figure 5B:
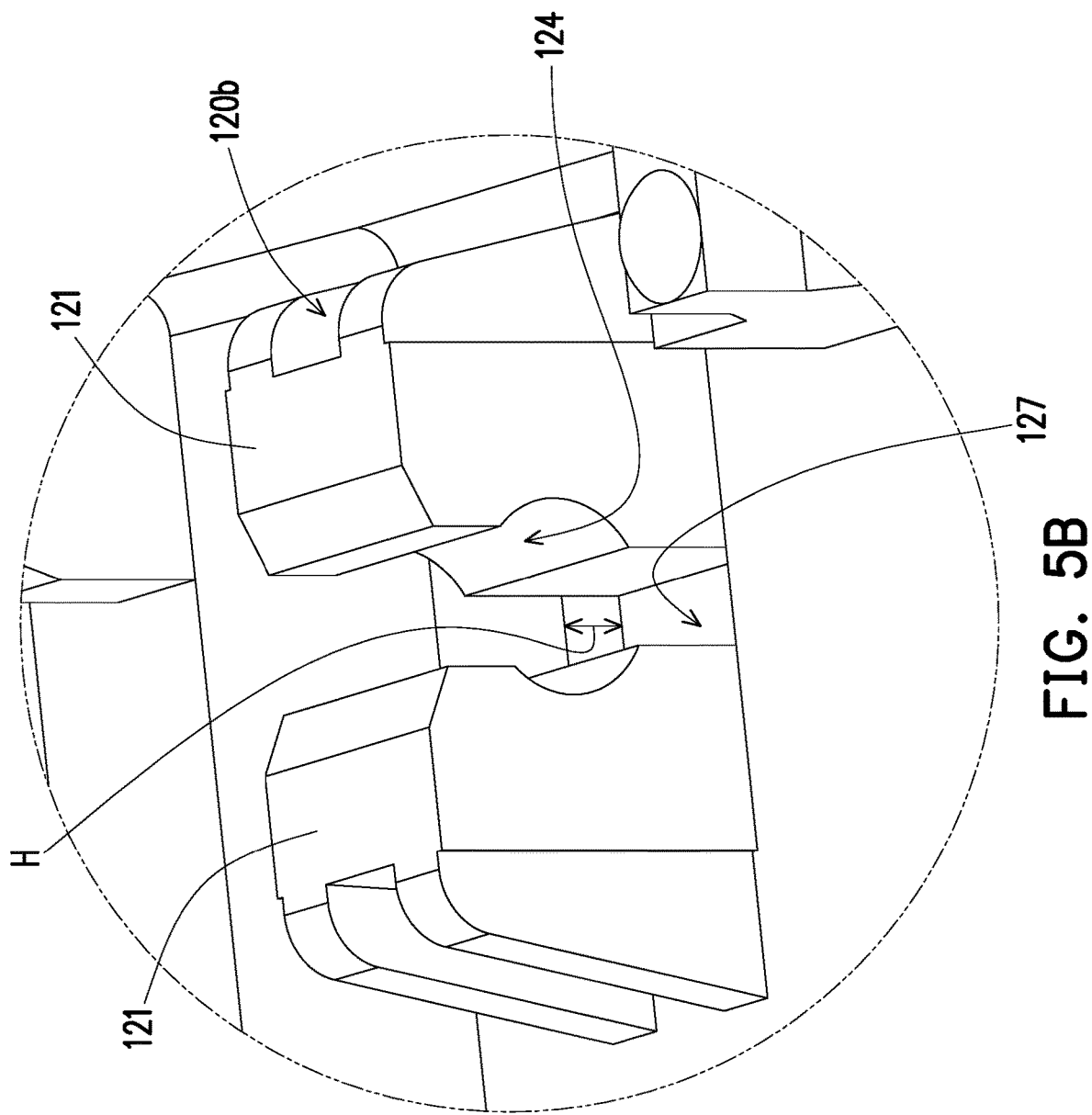
FIG. 5B is a partially enlarged schematic view of FIG. 5A.

FIG. 5A is a schematic view of a bottom surface of a keycap of a key module according to still another embodiment of the disclosure. FIG. 5B is a partially enlarged schematic view of FIG. 5A. Please refer to FIG. 5A and FIG. 5B. The main difference between the pivoting member 120b of the keycap 100b of FIG. 5A and the pivoting member 120a of FIG. 4 is that, in the embodiment, the hollowed-out area 127 not only separates the two projections 121 but also is recessed in the bottom surface 110 of the keycap 100b. In other words, the hollowed-out area 127 is formed by a recess of the bottom surface 110 and the hollowed-out area 123a (FIG. 4) wherein such recess and the hollowed-out area 123a are connected to each other. In the embodiment, the hollowed-out area 127 is recessed in the bottom surface 110 of the keycap 100b to a depth H between 0.03 mm and 0.07 mm, but the disclosure is not limited thereto, as long as the depth does not affect the structural strength of the keycap 100b. Such design can reduce the overall thickness of this area, and avoid the possibility of appearance shrinkage during injection molding.

In summary, the key module of the disclosure can reduce the thickness of the keycap in this area by providing a hollowed-out area at the pivoting member of the keycap, thereby reducing the occurrence of shrinking of the outer surface of the keycap due to excessively large thickness in this area, thus maintaining the integrity of the appearance. The hollowed-out area can be disposed at the connecting portion between the two projections, or between the two projections, and the entire connecting portion can be hollowed out to be further recessed in the bottom surface of the keycap; the location of the hollowed-out area is not limited thereto as long as the overall thickness of the area where the pivoting member is located can be reduced. In other embodiments, the hollowed-out area may also be provided on the projection, for example, on the premise that the essential structural strength of the pivoting member is maintained, the thickness of the projection in the extending direction on the third side of the first leg can be partially hollowed out; alternatively, the height of the projection protruding from the bottom surface of the keycap can be partially hollowed out and so on. The above designs can reduce the thickness of the keycap in this area, thereby reducing the occurrence of shrinking of the outer surface of the keycap due to excessively large thickness in this area, while maintaining the integrity of the appearance.

Finally, it should be noted that the above embodiments are only used to illustrate the technical solution of the disclosure, rather than limiting it; although the disclosure has been described in detail with reference to the foregoing embodiments, those of ordinary skill in the art should understand that: the technical solutions described in the foregoing embodiments can still be modified, or some or all of the technical features can be equivalently replaced; and these modifications or replacements do not deviate the essence of the corresponding technical solutions from the scope of the technical solutions in the embodiments of the disclosure.

What is claimed is:

1. A key module, comprising:
    a bottom plate;
    a keycap, disposed above the bottom plate, comprising a pivoting member protruding from a bottom surface of the keycap and a sliding member, wherein the pivoting member has a pivot hole and a hollowed-out area communicating with the pivot hole; and
    a scissor structure, disposed between the bottom plate and the keycap, and comprising a first leg and a second leg pivotally connected to each other, wherein a first side of the first leg and a second side of the second leg are connected to the bottom plate, a third side of the first leg is rotatably connected to the pivoting member of the keycap, and a fourth side of the second leg is slidably connected to the sliding member of the keycap, wherein the pivoting member comprises two projections and a connecting portion connected to the two projections, the two projections and the connecting portion encircle the pivot hole together, and the hollowed-out area is formed at the connecting portion, wherein a thickness of the projection in an extending direction on the third side of the first leg is between 0.7 mm and 1 mm, a thickness of the connecting portion in the extending direction is between 0.3 mm and 0.6 mm.

2. The key module according to claim 1, wherein the hollowed-out area is disposed between the pivot hole and the bottom surface of the keycap.

3. The key module according to claim 1, wherein the hollowed-out area comprises a rectangular slot, a trapezoidal slot, an arc-shaped slot, or an irregular slot.

4. The key module according to claim 1, wherein a width of the hollowed-out area is smaller than a diameter of the pivot hole.

5. A key module, comprising:
    a bottom plate;
    a keycap, disposed above the bottom plate, comprising a pivoting member protruding from a bottom surface of the keycap and a sliding member, wherein the pivoting member has a pivot hole and a hollowed-out area communicating with the pivot hole; and
    a scissor structure, disposed between the bottom plate and the keycap, and comprising a first leg and a second leg pivotally connected to each other, wherein a first side of the first leg and a second side of the second leg are connected to the bottom plate, a third side of the first leg is rotatably connected to the pivoting member of the keycap, and a fourth side of the second leg is slidably connected to the sliding member of the keycap, wherein the pivoting member comprises two projections and a connecting portion connected to the two projections, the two projections and the connecting portion encircle the pivot hole together, and the hollowed-out area is formed at the connecting portion, wherein in an extending direction on the third side of the first leg, the length of the hollowed-out area is between ⅓ and ⅔ of the thickness of the projection.

6. The key module according to claim 5, wherein the hollowed-out area is disposed between the pivot hole and the bottom surface of the keycap.

7. The key module according to claim 5, wherein the hollowed-out area comprises a rectangular slot, a trapezoidal slot, an arc-shaped slot, or an irregular slot.

8. The key module according to claim 5, wherein a width of the hollowed-out area is smaller than a diameter of the pivot hole.

9. A key module, comprising:
    a bottom plate;
    a keycap, disposed above the bottom plate, comprising a pivoting member protruding from a bottom surface of the keycap and a sliding member, wherein the pivoting member has a pivot hole and a hollowed-out area communicating with the pivot hole; and a scissor structure, disposed between the bottom plate and the keycap, and comprising a first leg and a second leg pivotally connected to each other, wherein a first side of the first leg and a second side of the second leg are connected to the bottom plate, a third side of the first leg is rotatably connected to the pivoting member of the keycap, and a fourth side of the second leg is slidably connected to the sliding member of the keycap, wherein the pivoting member comprises two projections, and the hollowed-out area is formed between the two projections to separate the two projections, wherein the hollowed-out area is recessed in the bottom surface of the keycap and wherein the hollowed-out area is recessed in the bottom surface of the keycap to a depth of 0.03 mm to 0.07 mm.

10. The key module according to claim 9, wherein the hollowed-out area comprises a rectangular slot, a trapezoidal slot, an arc-shaped slot, or an irregular slot.

11. The key module according to claim 9, wherein a width of the hollowed-out area is smaller than a diameter of the pivot hole.

\* \* \* \* \*